United States Patent
Bennett et al.

(10) Patent No.: US 12,227,025 B2
(45) Date of Patent: Feb. 18, 2025

(54) GLITTER ALTERNATIVE

(71) Applicant: Hallmark Cards, Incorporated, Kansas City, MO (US)

(72) Inventors: Barbara A. Bennett, Kansas City, MO (US); Ricky D. Eisel, Kansas City, MO (US); Laura A. Haverkamp, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 207 days.

(21) Appl. No.: 17/958,056

(22) Filed: Sep. 30, 2022

(65) Prior Publication Data

US 2024/0109363 A1 Apr. 4, 2024

(51) Int. Cl.
| | | |
|---|---|---|
| *B29C 65/00* | (2006.01) | |
| *B44C 1/14* | (2006.01) | |
| *B29C 65/48* | (2006.01) | |
| *B42D 15/04* | (2006.01) | |

(52) U.S. Cl.
CPC .............. *B44C 1/145* (2013.01); *B29C 65/00* (2013.01); *B29C 65/48* (2013.01); *B42D 15/042* (2013.01)

(58) Field of Classification Search
CPC ................................. B29C 65/00; B29C 65/74
See application file for complete search history.

(56) References Cited

U.S. PATENT DOCUMENTS

| | | | | | |
|---|---|---|---|---|---|
| 4,503,110 | A | * | 3/1985 | Skene ....................... | B44C 3/08 156/59 |
| 5,587,037 | A | * | 12/1996 | Fellner ..................... | B44F 1/00 156/272.2 |
| 2004/0000735 | A1 | * | 1/2004 | Gilbert, Sr. ........... | C04B 35/536 264/319 |
| 2005/0118356 | A1 | * | 6/2005 | Weder ..................... | B44C 1/14 428/21 |
| 2012/0081485 | A1 | * | 4/2012 | Ohashi .................. | B44C 1/1704 156/230 |
| 2014/0210843 | A1 | * | 7/2014 | VanCuren, Jr. ........ | G06T 11/001 345/589 |
| 2016/0311245 | A1 | * | 10/2016 | Belling ................. | B44C 1/1716 |
| 2018/0326718 | A1 | * | 11/2018 | Unal .................. | B41M 5/38228 |
| 2020/0031160 | A1 | * | 1/2020 | Ammon ............... | B44C 1/1729 |

\* cited by examiner

*Primary Examiner* — Philip C Tucker
*Assistant Examiner* — Nickolas R Harm
(74) *Attorney, Agent, or Firm* — Stinson LLP (57) ABSTRACT

A sustainable and environmentally friendly alternative to glitter includes a plurality of foil flecks adhered to consumer paper products to provide shine and sparkle and emulate traditional glitter. A consumer paper product, such as a greeting card, and a transfer foil are run through a foil press having a patterned die with a pattern thereon. A plurality of foil flecks are transferred from the foil using the die press and are affixed to the consumer paper product to add sparkle and visual interest.

20 Claims, 10 Drawing Sheets

GLITTER ALTERNATIVE

BACKGROUND

Greeting cards and consumer paper products can have various elements that contribute to the card-opening and consumer product experience. Greeting cards and consumer paper products can include a variety of embellishments, such as glitter, to visually enhance and improve the consumer product experience. Traditional glitter, however, is not environmentally friendly or sustainable. Additionally, greeting cards with traditional glitter thereon are notorious for losing glitter during handling. This makes greeting cards with traditional glitter thereon unsuitable for use in post-print applications where a finished greeting card must be run through a printer to add custom purchaser sentiment or element. Accordingly, there is a need for a glitter alternative that is both sustainable and securely attachable to a greeting card or the like.

BRIEF DESCRIPTION OF THE SEVERAL VIEWS OF THE DRAWINGS

The present systems and methods related to consumer paper products with a glitter alternative are explained in more detail below with reference to the embodiments illustrated in the attached drawing figures, in which like reference numerals denote like elements, in which FIGS. 1-13 illustrate various possible embodiments of the present invention, and in which:

DESCRIPTION

This detailed description is related to consumer paper products having foil flecks applied thereto to provide shine and sparkle as an alternative to glitter. For example, a greeting card can include a plurality of foil flecks or micro-dots placed thereon to add sparkle to a consumer paper product.

The methods described herein may be used with consumer paper products such as greeting cards, gift bags, roll-wrap, books, book covers, puzzles, frames and packaging, but are not limited thereto. In examples, after a design is printed in ink on a greeting card, the greeting card and a transfer foil are run through a foil press. A plurality of foil flecks are transferred from the transfer foil using a foil die press. The plurality of foil flecks are affixed to the greeting card via the transfer. For example, the foil flecks be may transferred from a variety of transfer foils, including holographic transfer foil. The foil flecks may be a variety of different shapes, sizes and patterns, and may be spaced apart different distances to provide varying sparkle as an alternative to glitter.

Having described some general examples of what this disclosure is related to, some more specific examples are now provided. In some instances, glitter is added to a greeting card to provide sparkle and embellishment. Glitter is a micro plastic and is not eco-friendly/sustainable. Greeting cards embellished with loose glitter are problematic to the printing process. Loose glitter can interfere with printing components (e.g., print heads, feeders, rollers, guides, etc.) and affect print quality. Even if the glitter is applied after the printing process, there may be a need later to run the finished card through a printer again, such as if the card is selected for a print on demand or post-print application.

In an example of the present disclosure, a greeting card blank is ink printed with a design. The design is printed on a greeting card blank or greeting card stock. In some implementations, the design is printed on a greeting card or greeting card stock using a four-color lithography press. The design may include a graphics such as text, numbers, letters, pictures, and symbols.

The greeting card or greeting card stock with the printed design is then transferred to a separate foil press for affixing a plurality of foil flecks thereto to simulate the application of glitter to the card. In some examples, the greeting card blank or greeting card stock is transferred to a separate foil press before printing. The foil press has a patterned foil die for transferring or stamping the plurality of foil flecks from a sheet or roll of transfer foil. The transfer foil is generally a sheet of foil material coupled with a carrier or backing. The plurality of foil flecks are transferred from the foil layer or sheet of the transfer foil by way of portions of the foil die coming into contact with the transfer foil and pressing it against the card. The pressure of the portions of the foil die transfer portions of the foil to the surface of the greeting card or greeting card stock in the shape of the portions of the foil die that abut the transfer foil.

While solid color foil may be used, transfer foils of multiple colors, including holographic foils, can enhance the appearance and glitter effect. In other examples, cold foils may be utilized to create a plurality of foil flecks. The use of foil is a sustainable process allowing greeting cards to be recycled and the greeting card paper to be re-pulped. The use of foil, unlike glitter, also allows the greeting cards to go through a printer for printing additional custom or personalized messages (e.g., post-print) without interfering with the printer components. A greeting card with a plurality of foil flecks can be used with a digital printer without interfering with print quality or coming off and clogging the printer.

The foil dies used in the process may have a plurality of patterns to provide for the transfer of a plurality of flecks and/or microdots from transfer foils. In examples, the flecks and/or microdots may be any shape including round, oval, square, triangle, rectangle and the like. The plurality of flecks may be randomly or uniformly dispersed in the pattern to best showcase the graphic or holograph of the foil. For example, when using holographic transfer foil, randomly dispersed round microdots may showcase the visual reflectivity of the foil and best emulate the various sparkles and colors of traditional glitter.

In examples, a mix of small and large dots in a pattern showcase the visual reflectivity and design spacing needs for embellishing a consumer paper product, such as a greeting card, as a glitter alternative. In examples, the plurality of flecks and/or microdots may also vary in density. In examples, the density of the flecks to the size of the design and/or consumer paper product (e.g., greeting card) may be light to medium densely-spaced patterns. Further, each of the plurality of flecks may range in size from 0.02"-0.05" in diameter or larger. And, each of the plurality of flecks in a pattern may be spaced 0.014"-0.14" distance apart from one another. Alternatively, they could be spaced up to 0.28" or larger apart from each other.

Figure 10A:
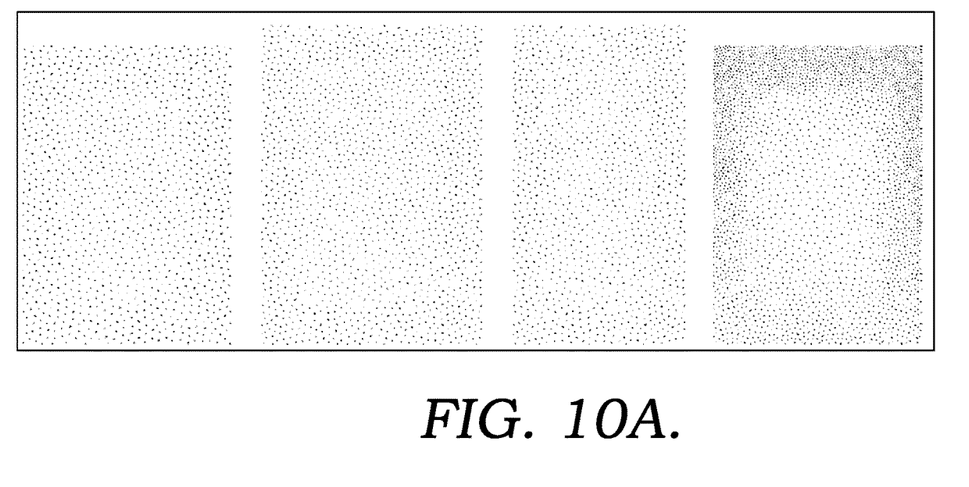
FIGS. 10A-10C depict a variety of possible foil transfer patterns from dies for transferring a plurality of foil flecks in different sizes, spaces and patterns, in accordance with examples of this disclosure.
Figure 10B:
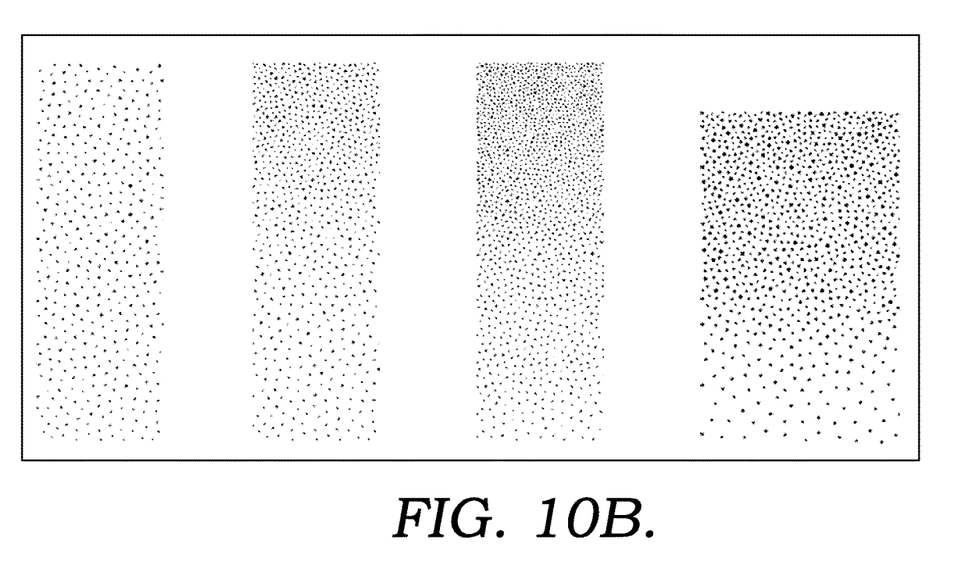
Figure 10C:
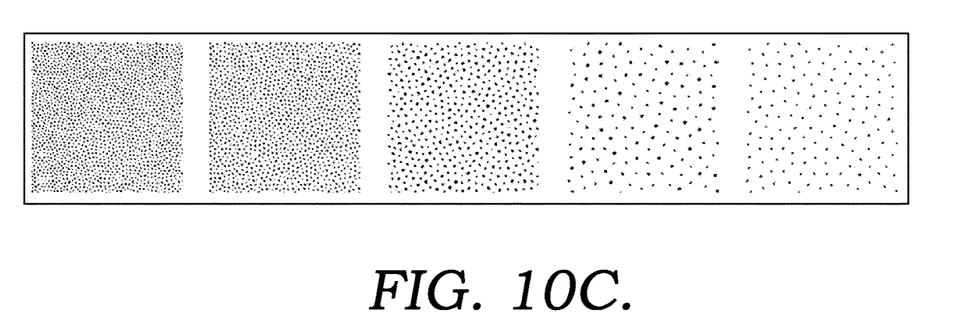

The patterns for the flecks may be full coverage of a portion of the consumer paper product (e.g., greeting card) or may be placed in a gradient or fade patterns, as shown in FIGS. 10A-10C. FIG. 10A includes exemplary fade patterns of a plurality of flecks. FIG. 10B includes exemplary gradient patterns of a plurality of flecks. FIG. 10C includes exemplary full coverage patterns of a plurality of flecks. The patterns for the plurality of foil flecks were developed from greeting card designs and historical applications of glitter. In some examples, the patterns showcase the holographic or graphic effect of the foil but do not repeat the pattern of the holograph or graphic to provide optimum visual effects without being too busy. In other examples, multiple different patterns may be utilized for a single greeting card design. For example, a designer may want one portion of a consumer paper product to have a gradient pattern of a plurality of foil flecks and a second portion of the consumer product to have a full coverage pattern.

When the foil press is a heated press, the temperature and pressure of the foil press may impact the graphic or holograph of the transfer foil. For example, a high temperature of the patterned die can dull graphics and holographs of the foil such that the reflectivity of the foil is dulled. In examples, to prevent dulling and distortion, the temperature of the heated foil press may be below 225° and the pressure of the foil press is at a level where the impression of the foil die does not push below the surface of the paper. Due to the nature of the graphic and holographic foils used, when a heated foil press is used, the foil press may be at a cooler temperature than in prior foil transfer applications to maintain the graphics and holographic shine of the transfer foils while still allowing the plurality of flecks to be affixed to the consumer paper product.

Prior art glitter alternatives can be expensive. In examples described herein, to make the use of transfer foils as glitter alternatives more economical, an area of a transfer foil may be used to embellish more than one greeting card in what has been coined a partial pull method. According to the partial pull method, after the initial transfer of a plurality of foil flecks from an area of the foil, at least a portion of the previously used area of the foil is used again for a subsequent transfer with the patterned foil die. For example, in one embodiment of the partial pull method, if the design image of a greeting card is 100 mm, the foil roll is only advanced 50 mm or 50 percent of what was done in prior art full pull applications. In this example, the subsequent transfer of the transfer foil to a consumer paper product is done on 50 mm of previously used foil material and 50 mm of new foil is used to transfer a plurality of foil flecks.

The percentage of foil that is re-used for a subsequent consumer paper product depends on the design, die pattern, and type of foil used. For example, a holographic foil that is highly reflective and gives off different colors and sparkle may be able to be re-used several times for additional consumer products. In another example, if a creative design utilizes a large number of foil flecks and regular foil, a smaller percentage of the foil may be reused. The percentage of partial pull of foil is dependent on the fleck and microdot patterns in order to keep the visual look random and reduce visual breaks. A combination of patterns may vary the percentage of partial pull of foil that may be utilized.

The partial pull method is different from a short pull, which is an industry term to describe an incomplete transfer that occurs from not advancing the film far enough between transfers and which creates poor quality in the prior art. The partial pull method is intentional and not noticeable due to the reflectivity of the foil, particularly holographic foil, and the variations in patterns and sizes and shapes of transferred portions. The partial pull method contemplates that there may be an incomplete transfer of some of the plurality of flecks but that it will be unnoticeable to the overall card design. While some of the individual flecks of the plurality of flecks may be partial flecks, due to the nature of the foil, a commercial grade paper product is still produced using the partial pull method.

The partial pull method uses less raw material and produces less waste making it better for the environment and more cost effective. The partial pull method described in the examples uses the raw foil material to its fullest extent. The percentage of foil that can be re-used can change based on creative design, the different patterns used and type of foil.

Figure 1:
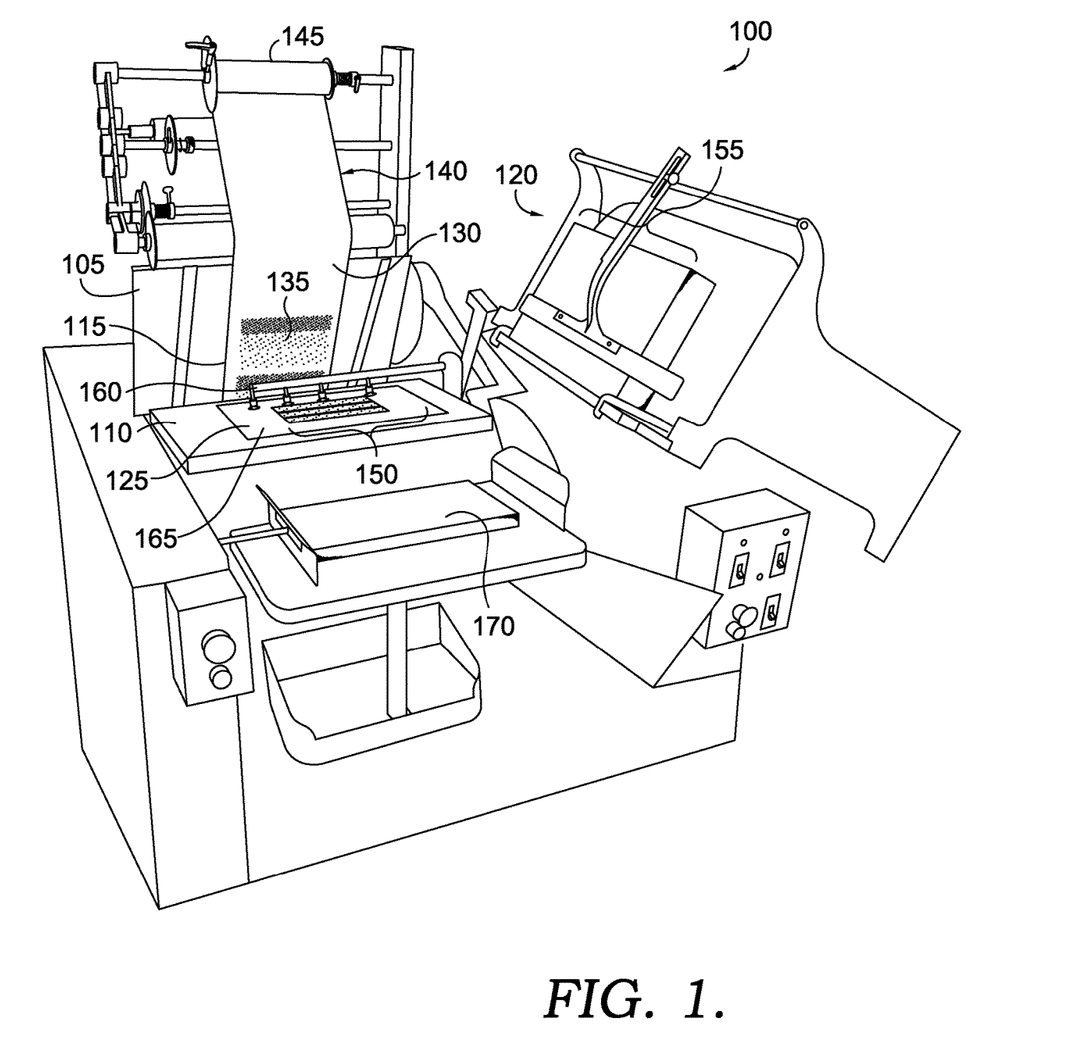
FIG. 1 is a perspective view of an exemplary foil press for creating a consumer paper product with glitter alternative, in accordance with an embodiment of the present invention.

Referring now to FIG. 1, FIG. 1 depicts one possible example of a method and system and associated components thereof for affixing a plurality of foil flecks 150 to a greeting card 125. In the illustrated example embodiment, the system includes a foil press 100, the greeting card 125, and a transfer foil 130 for affixing the plurality of foil flecks 150 to the greeting card 125. In the illustrated embodiment, the foil press 100 is a heated foil press and the transfer foil 130 is a hot foil. In other embodiments the foil press 100 need not be a heated foil press, but could be non-heated presses, like those used in cold or toner foil application methods known in the art and the transfer foil 130 could be a cold foil. The transfer process described herein could also utilize a UV transfer or a thermal ink jet application. In accordance with examples of the present disclosure, the greeting card 125 includes a greeting card blank or card paper. The greeting card 125 may have an image printed on it before or after being used with the foil press 100.

In some instances, such as the illustrated embodiment, the foil press 100 is a clam shell foil press with a first platen 105 and a second platen 110. It would be understood by one of ordinary skill in the art that other types of foil presses may be used. FIG. 1 depicts the first platen 105 and second platen 110 of foil press 100 in an open position 120. A patterned die 115 is positioned on platen 105. The patterned die 115 is removable and can be replaced with other patterned dies having a variety of patterns, such as those shown in FIGS. 10A-10C. A consumer paper product, such as the greeting card 125, is fed from a paper feeder 155 to the second platen 110. In examples, a paper gripper 160 transfers greeting the card 125 from the paper feeder 155 to the second platen 110.

The transfer foil 130 is fed from a foil roll 145 between a patterned die 115 and the greeting card 125. The transfer foil 130 has a first graphic side 135 and a second transfer side 140. The transfer foil 130 is fed to the foil press such that the graphic side 135 is facing the patterned die 115 and the transfer side 140 faces the greeting card 125. In examples, the transfer side 140 faces the printed design side of the greeting card. In examples, the transfer side 140 is coated with an adhesive or glue that is activated by heat (in a heated press embodiment) and/or pressure of the foil press 100 in a closed position.

The first platen 105 and the second platen 110 are brought together to a closed position activating the foil press 100. The activation of the foil press 100 brings, in the illustrated embodiment, the pressure a level where the impression of the foil die does not push below the surface of the paper and the temperature to range below 225°. The pattern of the patterned die 115 is heated and abuts the graphic side 135 of the transfer foil 130 and presses the transfer side 140 of the transfer foil 130 into contact with an upwardly facing surface of the greeting card 125 in the shape of the pattern. The heated pattern of the patterned die 115 and the pressure then transfers portions of the transfer foil 130 to the surface of the greeting card 125 in the shape of the pattern and causes the transferred portions to adhere to the greeting card 125, thereby creating a plurality of foil flecks 150 on the greeting card 125. A similar process may be used with non-heated foil presses.

Figure 2:
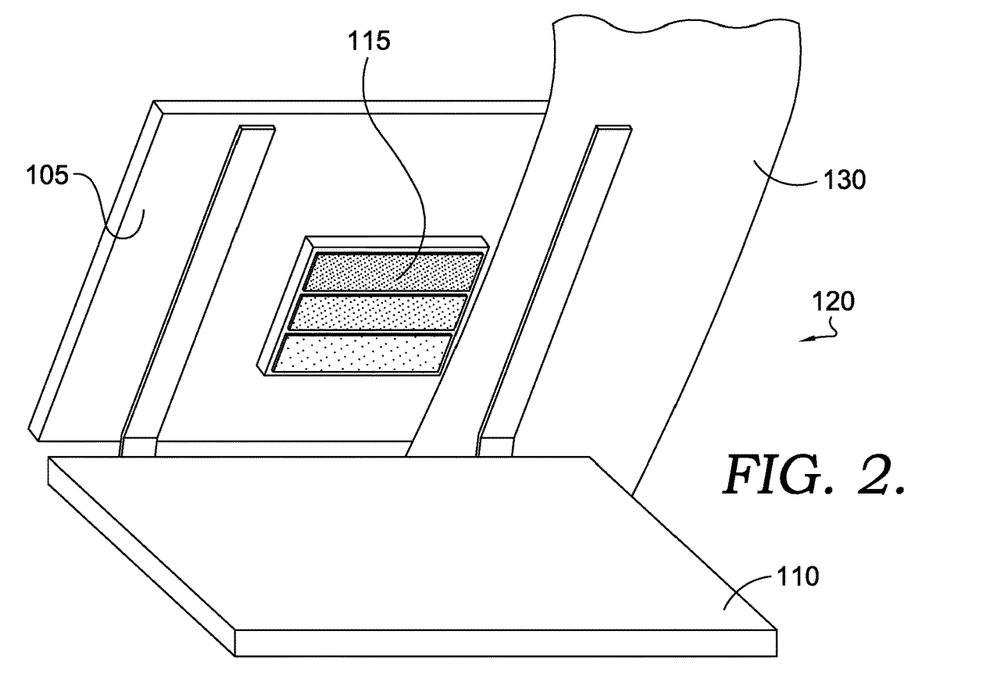
FIG. 2 is a fragmentary perspective view of a portion of the foil press of FIG. 1 in an open position with a patterned die exposed.

Referring now to FIG. 2, a close up view of foil press in an open position 120 is shown with the patterned die 115 visible. The patterned die 115 is positioned on the first platen 105 opposite the second platen 110. The patterned die 115 may be made from a variety of materials known in the art (e.g., a metal such as copper) for transferring the plurality of foil flecks 150. The patterned die 115 may be heated to facilitate transfer of portions of the transfer foil 130 in the shape of the pattern on the patterned die 115 and affix the plurality of foil flecks 150 to a consumer paper product.

Figure 3:
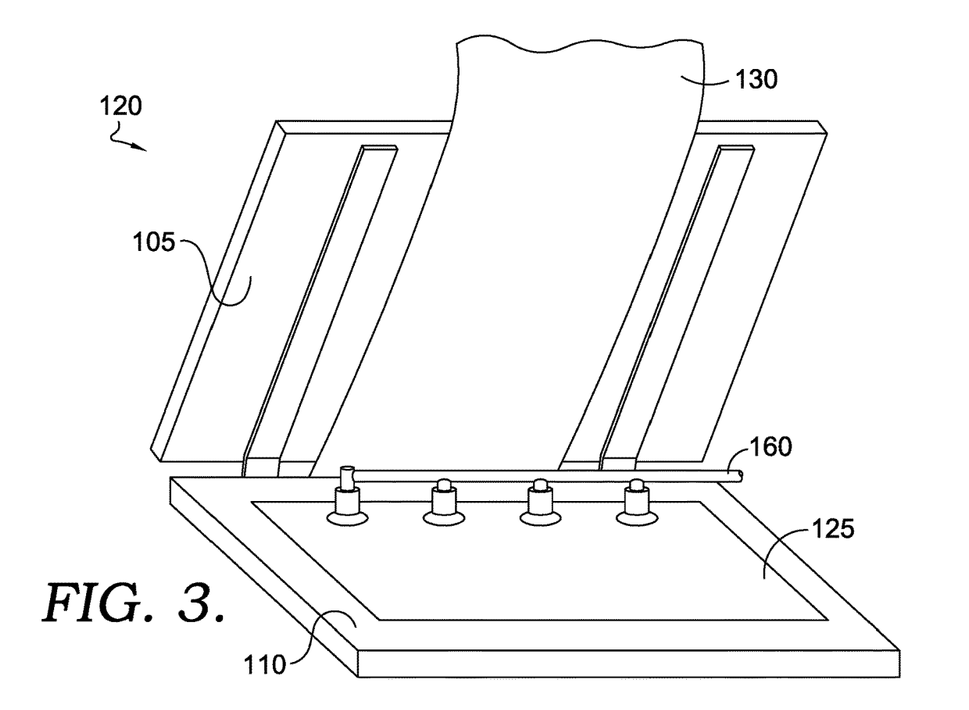
FIG. 3 depicts the portion of the foil press of FIG. 2 in an open position with a transfer foil positioned for transfer to a greeting card positioned on the portion of the foil press.

Referring now to FIG. 3, a close up view of the foil press 100 in the open position 120 is shown. The patterned die 115 (shown in FIG. 2) is positioned behind the transfer foil 130 on the first platen 105. A paper gripper 160 has positioned a greeting card 125 on the second platen 110. The patterned die 115 may be heated to facilitate transferring portions of the transfer foil 130 and affixing the plurality of foil flecks 150 to a consumer paper product 125. After the patterned die 115, the transfer foil 130, and the greeting card 125 are in position, the first platen 105 and second platen are brought together into a closed position. This causes the patterned die 115 to transfer a plurality of flecks 150 (i.e., pieces of the foil) from the transfer foil 130 and affix the plurality of flecks 150 to the greeting card 125.

Figure 4:
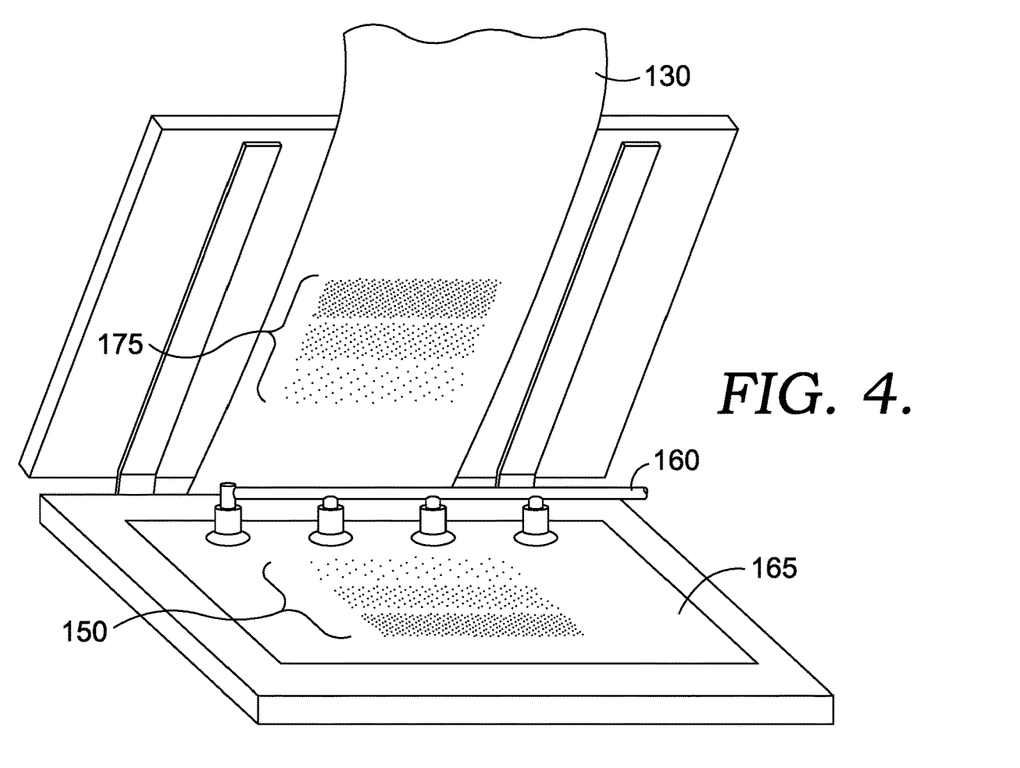
FIG. 4 depicts the portion of the foil press of FIG. 3 after transfer of a plurality of foil flecks from the transfer foil onto the greeting card.

Referring to FIG. 4, a close up view of the foil press 100 is show after it has been reopened and after transferring a plurality of flecks 150 from the transfer foil 130 to the greeting card 125. A plurality of voids (i.e., absences of foil) or holes 175 are created in the foil layer of the transfer foil 130 where the portions of the foil of the transfer foil 130 were transferred to the greeting card 125 during the transfer process in the shape of the portions of the patterned die 115 that abutted the transfer foil 130 (i.e., the pattern). The holes 175 are the absence of the plurality of foil flecks 150. The plurality of foil flecks 150 have been affixed to the greeting card 125 (of FIG. 3) creating finished product 165 of FIGS. 4 and 5.

Figure 6:
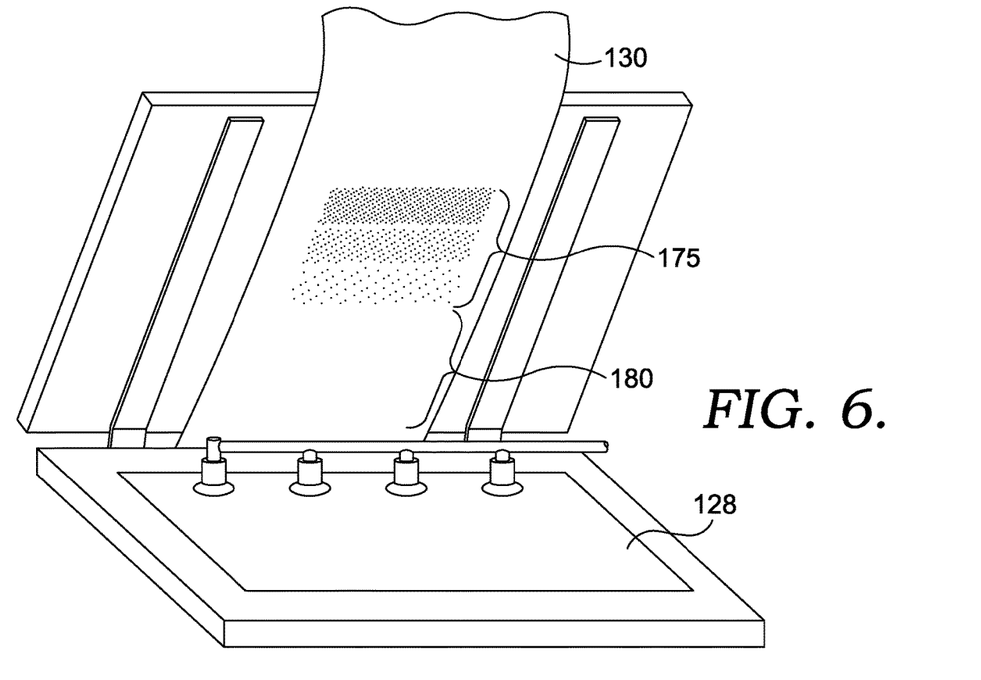
FIG. 6 depicts the portion of the foil press of FIG. 4 with a new greeting card positioned thereon and with the transfer foil partially pulled to allow for a second use of the transfer foil.
Figure 7:
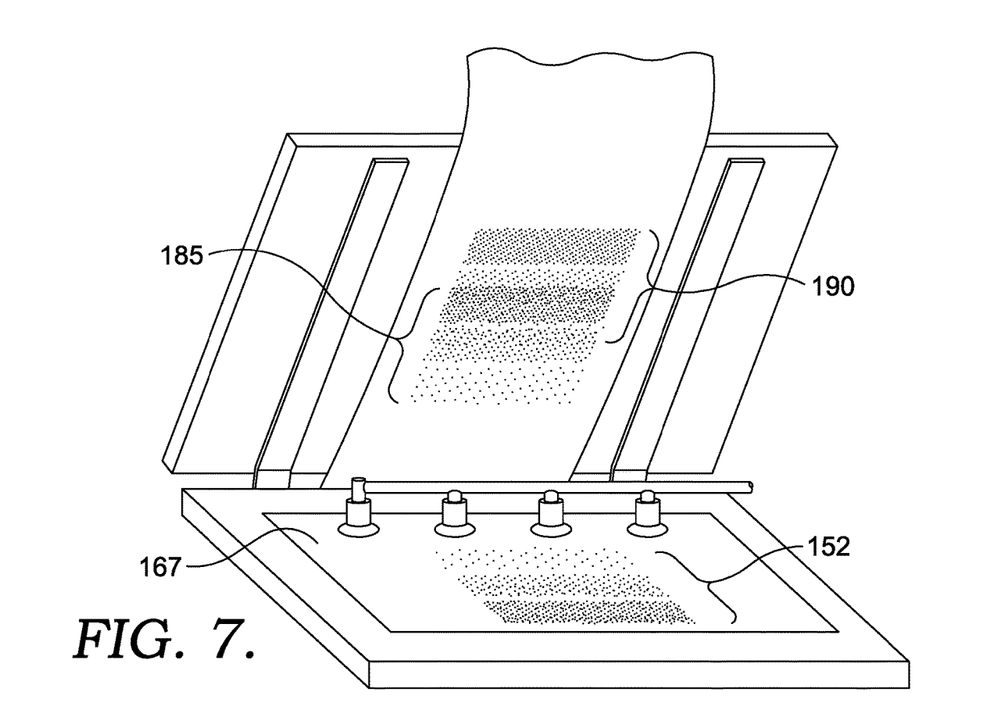
FIG. 7 depicts the portion of the foil press of FIG. 6 after transfer of a plurality of foil flecks from a partial pull of the transfer foil, in accordance with examples of this disclosure.

Referring next to FIGS. 6 and 7, a partial pull method for use with a foil press is shown. According to the partial pull method, after a first transfer of a plurality of foil flecks, as shown with reference to FIGS. 3 and 4, at least a portion of the area of the previously used transfer foil 130 for a first consumer product is used again for a subsequent transfer of a plurality of flecks 152 for a second consumer paper product 167.

Referring to FIG. 6, a close up view of the foil press 100 in an open position 120 after transferring portions of the foil 130 to a first greeting card and before transferring additional portions of the foil 130 to a second greeting card 128 is shown. The patterned die 115 is still positioned behind transfer foil 130 on the first platen 105. A new or second greeting card 128 is positioned on the second platen 110. The holes 175 on transfer foil 130 from transferring the first plurality of foil flecks 150 for the previous greeting card (greeting card 125 of FIG. 3) are shown. The foil 130, however, is advanced a longitudinal distance that is less than the entire longitudinal height of the area of holes 175 from the first transfer. After the patterned die 115, the transfer foil 130, and new greeting card 128 are in position, the first platen 105 and second platen 110 are again brought together into a closed position. This causes the patterned die 115 to transfer a second plurality of foil flecks 152 from the transfer foil 130 to the second greeting card 128 and affix the second plurality of flecks 152 to the new greeting card 128. The second plurality of flecks 152 are transferred from a portion of the foil 130 having holes 175 from the first transfer and a new portion of the foil 180 without holes.

Figure 9:
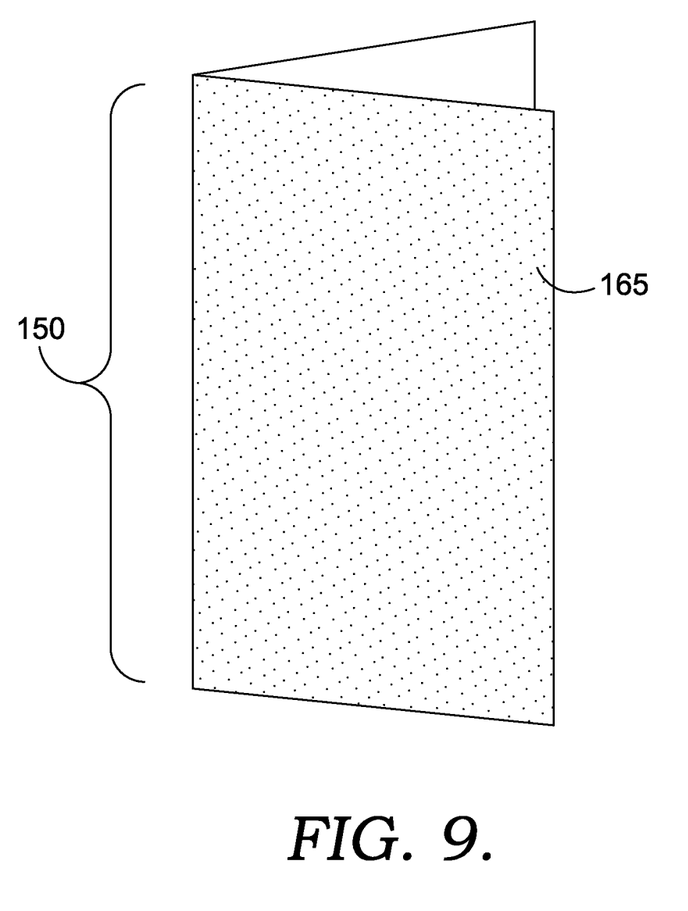
FIG. 9 depicts a perspective view of a greeting card with a plurality of foil flecks affixed thereto after a transfer from a transfer foil.

Referring to FIG. 7, a close up view of the foil press 100 after transferring the second plurality of foil flecks 152 from the transfer foil 130 is shown. The second plurality of foil flecks 152 have been affixed to the new greeting card 128 (of FIG. 6) creating finished product 167 of FIG. 7. A second plurality of holes 185 are created in the transfer foil 130 when transferring the second plurality of foil flecks 152 from at least some of the new portion of foil 180 (of FIG. 6). A plurality holes 190 have been created from transferring both the plurality of foil flecks 150 for first greeting card 125 (of FIG. 4) and the plurality of foil flecks 152 for the second greeting card 128 (of FIG. 6). The pattern of the plurality of foil flecks 150 affixed to the first greeting card 125 using the method of FIGS. 3 and 4 is substantially the same as the pattern of the second plurality foil flecks 152 on the second greeting card 128 using the partial pull method described with reference to FIGS. 6 and 7. For example, FIG. 9 depicts a finished greeting card 165 with a pattern of a plurality of foil flecks 150. The finished greeting card 165 with the plurality of flecks 152 made using the partial pull method of FIGS. 6 and 7 has substantially the same as the pattern as that of the finished greeting card 165 of FIG. 9.

Figure 5:
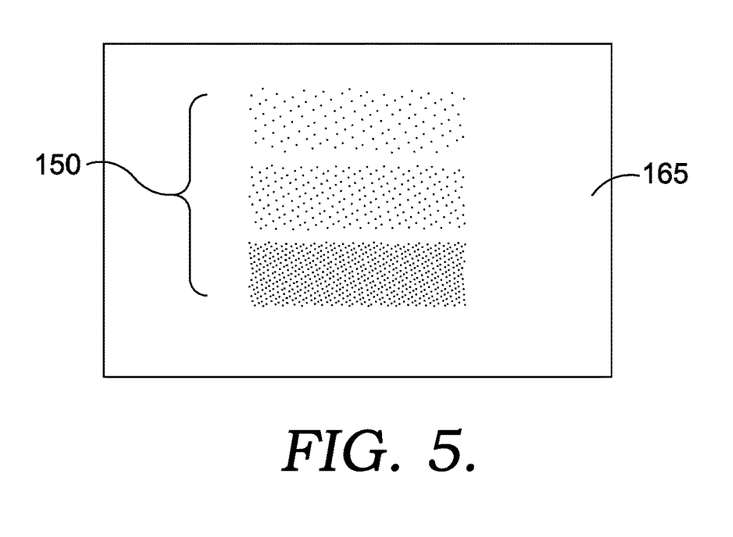
FIG. 5 depicts the greeting card of FIG. 4 with the plurality of foil flecks affixed thereto.
Figure 8:
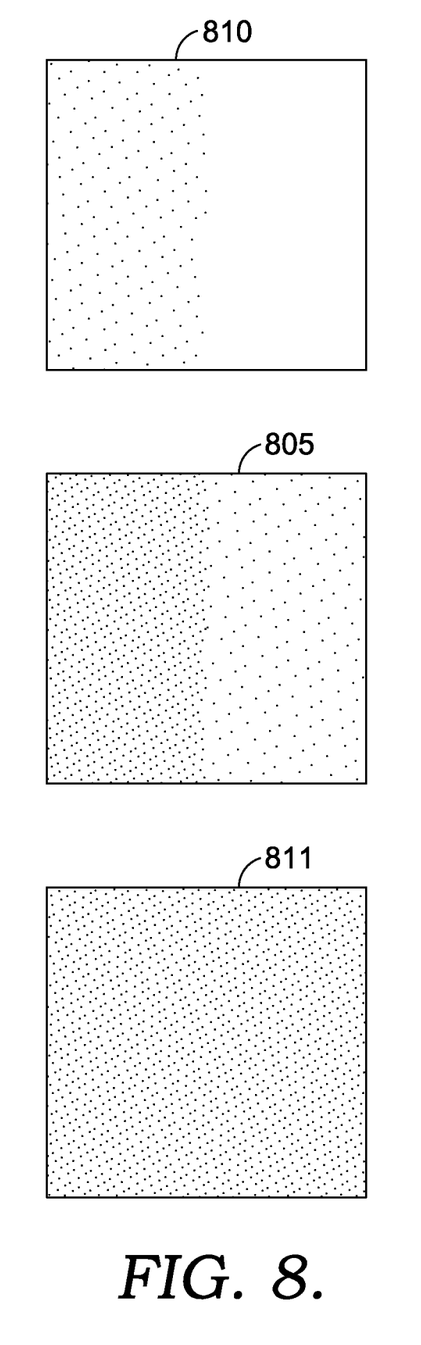
FIG. 8 depicts transfer foil after a single transfer of a plurality of foil flecks and after a partial pull with a second transfer of a plurality of foil flecks.

FIG. 8 depicts examples of the holes left in the foil portion of the transfer foil 130 after a plurality of foil flecks have been transferred and affixed to consumer paper products. Foil section 810 illustrates an example of the number of holes that are made in the foil layer of the transfer foil 130 when the left half of the transfer foil 130 has been used only once for a plurality of foil flecks according to the method of FIG. 4 and the right half has not yet been used. Foil section 805 illustrates an example of the number of holes when the left half of the transfer foil has been used twice for a plurality of foil fecks according to the partial pull method of FIG. 5 is shown in the foil section 805 and the right half has been used only once. Foil section 811 illustrates an example of the number of holes that are made in the foil layer of the transfer foil 130 when both the left and right half of the transfer foil 130 have been used twice. FIG. 8 is an example that the number of holes is greater and used surface area of the transfer foil is increased using the partial pull method of FIGS. 6 and 7. The foil is advanced between uses only a small amount to make use of the unused portions of foil remaining between the holes made from the previous use(s). The amount of advancement of the foil can vary depending on the shape, size, pattern, and density of the holes.

Figure 11:
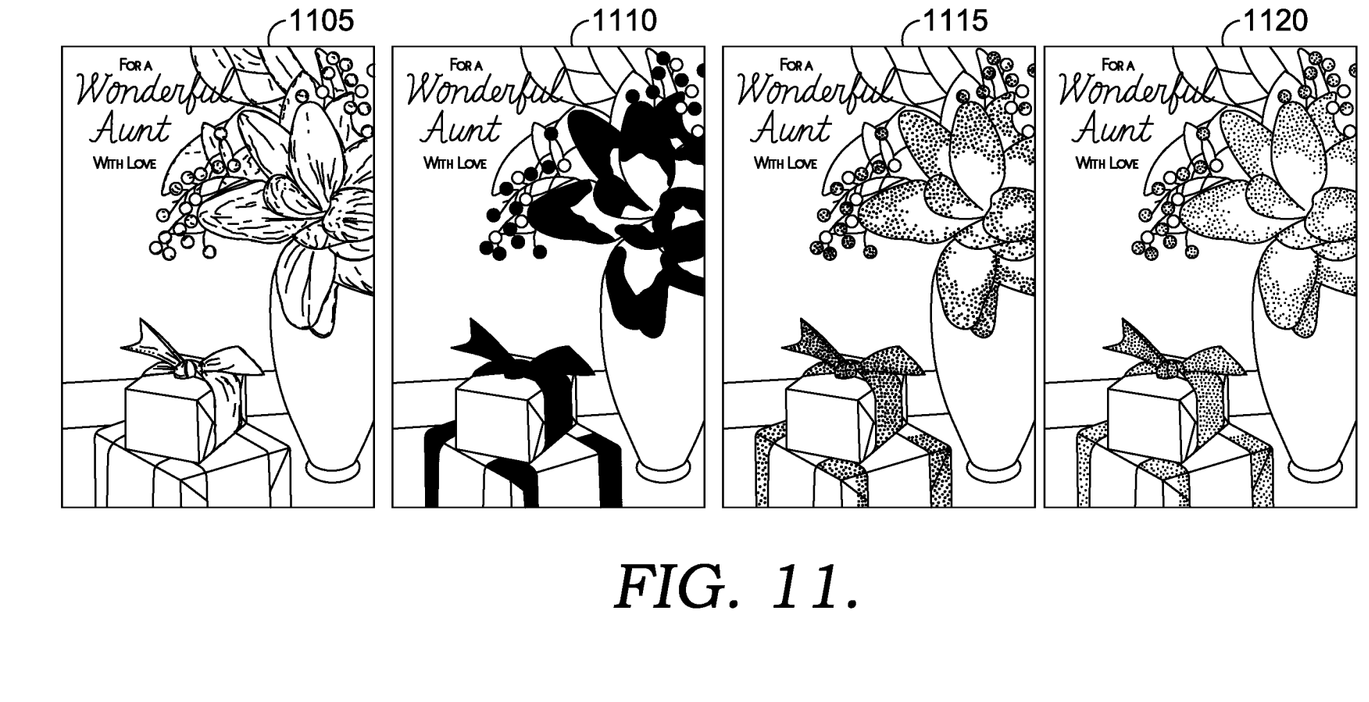
FIG. 11 depicts several stages in a process for manufacturing a greeting card with a plurality of foil flecks thereon to emulate glitter.

With reference to FIG. 11, a method for designing a consumer paper product with a glitter alternative is shown. In the illustrated example, a greeting card with a design is created at image 1105. The greeting card design in 1105 may be created by a user using by a computer processor and graphical user interface. The greeting card design is provided to the user, such as a designer, to indicate the preferred pattern of glitter alternative to use, preferred transfer foil to use, and where the portions of the transfer foil should be affixed to the design. Via a graphical user interface, the user identifies where in the black shaded area in image 1110 that the transfer foil should be affixed to the design. The user then selects the preferred pattern in image 1115 to add to the shaded area from 1110. For example, the user may select one of the patterns of FIGS. 10A-10C (other patterns are available).

In other examples other patterns may be developed and utilized for adding transfer foil flecks to a consumer paper product design. A rendering 1120 of the preferred pattern, preferred foil and where the transfer foil should be affixed is provided to the user with a concept of what the design with the pattern in the selected locations will look like on the final consumer paper product. When the user has finalized the design for a plurality of foil flecks, the design, foil selection, fleck location and pattern may communicated to a foil press, such as an automated foil press for printing and affixing the plurality of foil flecks to the consumer paper product. Alternatively, the design may be communicated to another person to create a die having the designed transfer pattern to achieve the transfer of foil flecks in the arrangement depicted in 1120.

Figure 12:
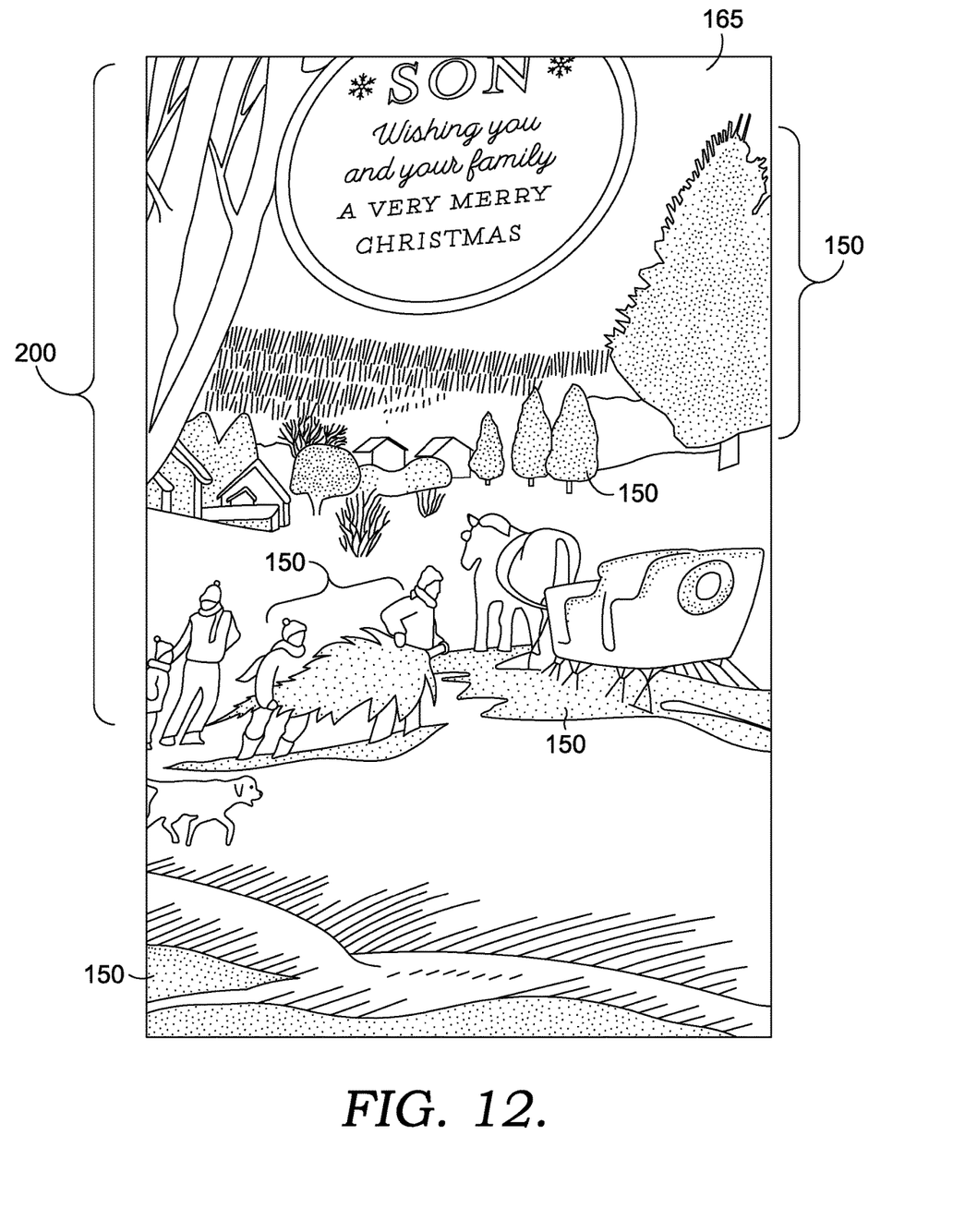
FIG. 12 depicts another view of a greeting card with both lithographic printing and application of a plurality of foil flecks affixed thereto to simulate glitter.

FIG. 12 depicts a final consumer paper product 165 with a printed design 200 and foil flecks 150 affixed thereto in various areas in the printed design 200. As can be seen in FIG. 12, the foil flecks 150 are affixed to a variety of locations on the final consumer paper product 165 to provide visual interest and sparkle to the product 165 and compliment the printed design 200. A variety of patterns of foil flecks 150 may be utilized on a single product 165 to provide visual interest as well.

Figure 13:
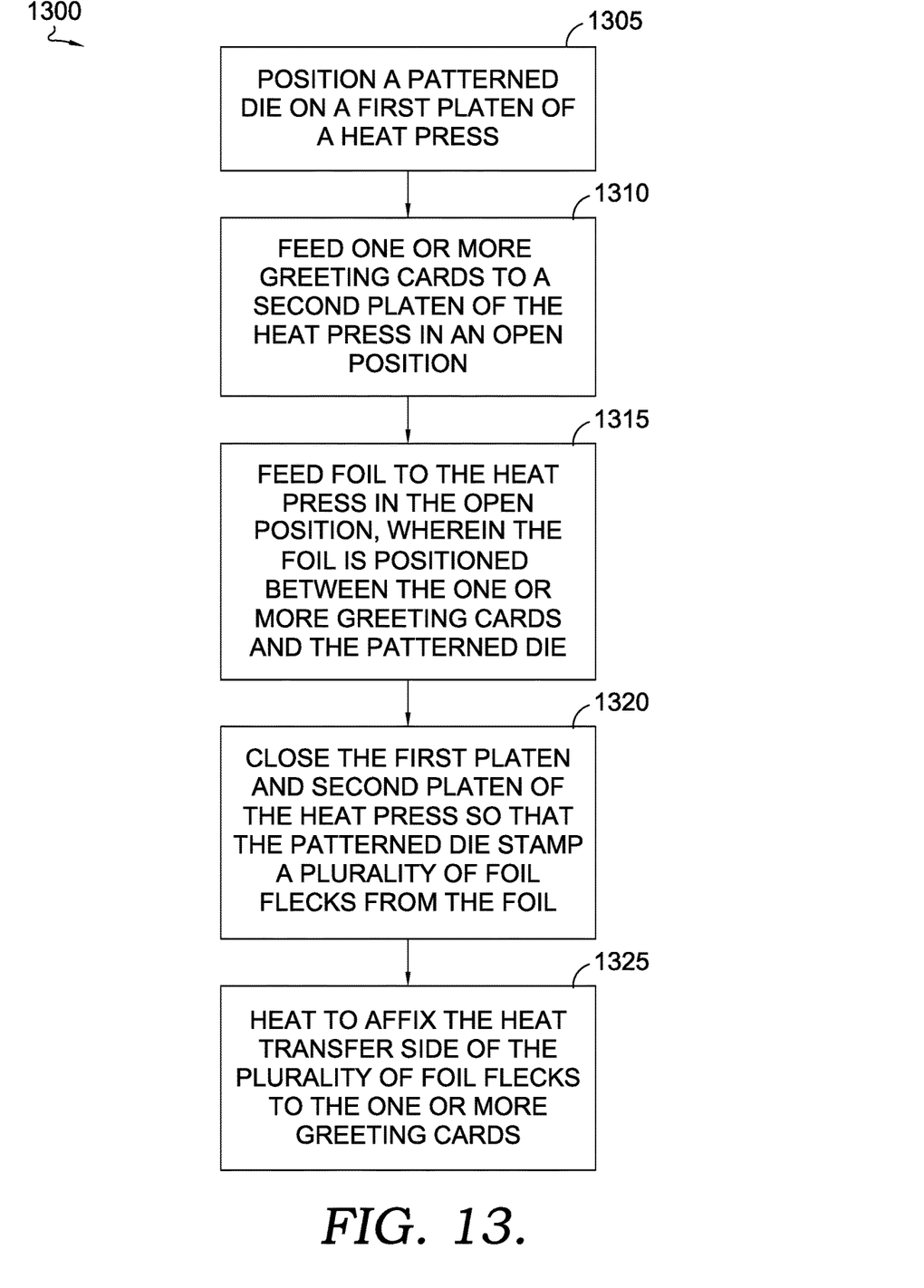
FIG. 13 depicts a flow diagram associated with a method for affixing a plurality of foil flecks to a greeting card, in accordance with examples of the present disclosure.

Referring to FIG. 13, a flow diagram is depicted that includes operations and steps in accordance with a method 1300 of the present disclosure. In addition, pictorials in FIGS. 1-12 provide further description of the operation and steps to illustrate one or more examples related to this description. In at least one example, the method 1300 can include affixing a plurality of foil flecks to one or more consumer paper products, such as a greeting card. At step 1305, a patterned die is positioned on a first platen of a foil press. The patterned die is patterned such that it will transfer or stamp holes in a transfer foil to create a plurality of foil flecks in an arrangement mirroring the pattern of the patterned die. At step 1310, one or more greeting cards are fed to a second platen of the foil press when the foil press is in an open position. At step 1315, transfer foil is fed to the foil press when the foil press is in an open position. The transfer foil is fed to be positioned between the one or more greeting cards and the patterned die.

At step 1320, the first and second platen of the foil press are brought together into a closed position. When in the closed position, portions of the patterned die in the shape of the pattern on the patterned die abut portions of the transfer foil and press portions of the transfer foil that will become a plurality of foil flecks into contact with the greeting card. At 1325, the pressure (and, if a heated foil press, the heat) from the foil press affixes the transfer side of the plurality of foil flecks to the greeting card or a consumer paper product to create a visual enhancement and alternative to glitter.

This detailed description is provided in order to meet statutory requirements. However, this description is not intended to limit the scope of the invention described herein. Rather, the claimed subject matter may be embodied in different ways (including those not shown), to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof. Alternative means of implementing the aforementioned can be completed without departing from the scope of the claims below. Certain features and sub-combinations are of utility, may be employed without reference to other features and sub-combinations, and are contemplated within the scope of the claims.

What is claimed is:

1. A method comprising:
   positioning a patterned die on a first platen of a foil press, the patterned die having a pattern thereon;
   feeding one or more consumer paper products to a second platen of the foil press in an open position;
   feeding a transfer foil to the foil press in the open position, wherein the transfer foil is positioned between the one or more consumer paper products and the patterned die such that a first graphic side of the transfer foil is facing the patterned die and a second transfer side of the transfer foil is facing the one or more consumer paper products;
   closing the first platen and the second platen of the foil press together so that the patterned die transfers a plurality of foil flecks from the transfer foil in the shape of the pattern; and
   utilizing pressure from the foil press to affix the plurality of foil flecks to the one or more consumer paper products.

2. The method of claim 1, wherein the plurality of foil flecks are microdots.

3. The method of claim 1, wherein the plurality of foil flecks are 0.02"-0.05" in diameter.

4. The method of claim 1, wherein the plurality of foil flecks are spaced apart 0.014"-0.14".

5. The method of claim 1, wherein the plurality of foil flecks are an alternative to a glitter.

6. The method of claim 1, wherein the one or more consumer paper products is adapted to be fed to a printer for customization after the plurality of foil flecks are affixed to the one or more consumer paper products.

7. The method of claim 1, wherein the one or more consumer paper products is a greeting card.

8. A method comprising:
positioning a patterned die on a first platen of a foil press, the patterned die having a pattern thereon;
feeding a first consumer paper product to a second platen of the foil press in an open position for a first transfer event;
feeding a transfer foil to the foil press in the open position, wherein the transfer foil is positioned between the first consumer paper product and the patterned die such that a graphic side of the transfer foil is facing the patterned die and a transfer side of the transfer foil is facing the first consumer paper product;
closing the first platen and the second platen of the foil press together so that the pattern of the patterned die abuts the graphic side of the transfer foil and presses a plurality of portions of the transfer foil into abutting contact with the first consumer paper product in the shape of the pattern, wherein the portions of the transfer foil pressed into abutting contact with the first consumer paper product are a first plurality of foil flecks;
utilizing pressure from the foil press to affix the first plurality of foil flecks to the first consumer paper product, thereby leaving holes in the transfer foil with a size, a shape, and a pattern of the first plurality of foil flecks;
advancing the transfer foil a distance for a second transfer event, wherein the distance the transfer foil is advanced is less than a height distance of the pattern of the patterned die;
reusing at least a portion of the transfer foil utilized in the first transfer event to create a second plurality of foil flecks in the second transfer event so that the patterned die creates the second plurality of foil flecks, wherein at least a portion of the second plurality of foil flecks are from a same area of the transfer foil where the first plurality of foil flecks were made; and
utilizing pressure from the foil press to affix the second plurality of foil flecks to a second consumer paper product.

9. The method of claim 8, wherein the first plurality of foil flecks are microdots.

10. The method of claim 8, wherein the first plurality of foil flecks are 0.02"-0.05" in diameter.

11. The method of claim 8, wherein the first plurality of foil flecks are spaced apart 0.014"-0.14".

12. The method of claim 8, wherein the transfer foil includes a plurality of colors and a plurality of patterns on the graphic side to create a plurality of reflections and emulate a light reflective nature and sparkle effect of a glitter and where the first plurality of foil flecks transferred from the transfer foil are an alternative to the glitter.

13. The method of claim 8, wherein the first consumer paper product is adapted to be fed to a printer for customization after the first plurality of foil flecks are affixed to the first consumer paper product.

14. The method of claim 8, wherein the first consumer paper product is a greeting card.

15. A system comprising:
a patterned die of a foil press for transferring a plurality of foil flecks from a transfer foil, the patterned die having a pattern thereon and wherein the pattern includes a plurality of micro dots in the shape of the plurality of foil flecks;
one or more consumer paper products positioned in the foil press;
wherein the transfer foil is positioned between the one or more consumer paper products and the patterned die such that a graphic side of the transfer foil is facing the patterned die and a transfer side of the transfer foil is facing the one or more consumer paper products; and
wherein the plurality of foil flecks transferred from the transfer foil are affixed to the one or more consumer paper products.

16. The system of claim 15, wherein the plurality of foil flecks are microdots.

17. The system of claim 15, wherein the plurality of foil flecks are 0.02"-0.05" in diameter.

18. The system of claim 17, wherein the plurality of foil flecks are spaced apart 0.014"-0.14".

19. The system of claim 15, wherein the transfer foil includes a plurality of colors and a plurality of patterns on the graphic side to create a plurality of reflections and emulate a light reflective nature and sparkle effect of a glitter and where the plurality of foil flecks transferred from the transfer foil are an alternative to the glitter.

20. The system of claim 15, wherein the one or more consumer paper products are adapted to be fed to a printer for customization after the plurality of foil flecks are affixed to the one or more consumer paper products.

* * * * *